Aug. 7, 1934.   A. E. BAUM   1,969,348
RELEASE VALVE FOR AIR BRAKES
Filed Jan. 19, 1933
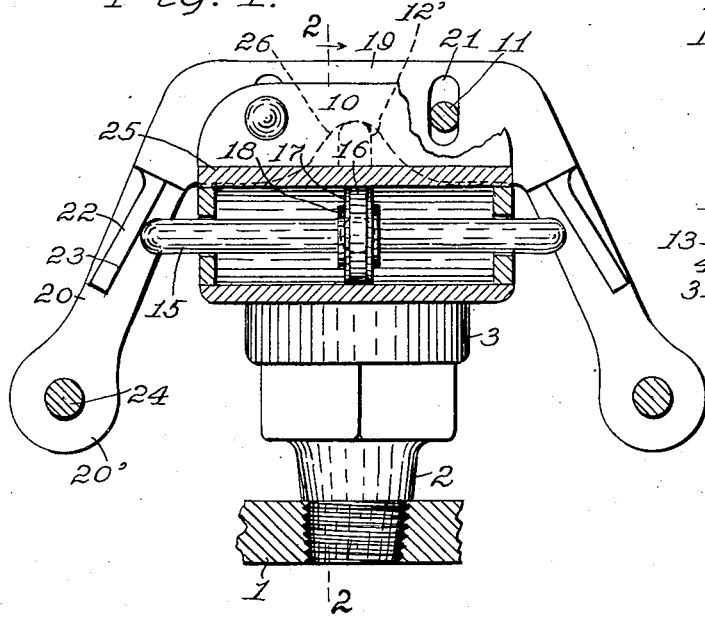
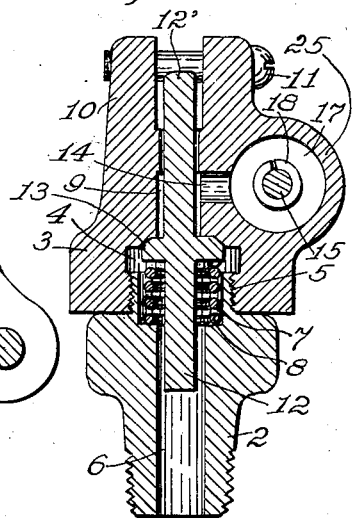
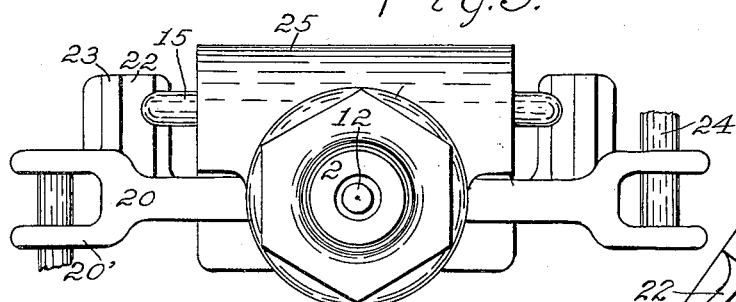
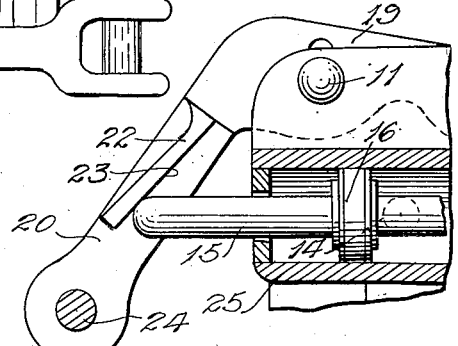
INVENTOR
Albert E. Baum,
BY G. C. Kennedy
ATTORNEY Patented Aug. 7, 1934

1,969,348

UNITED STATES PATENT OFFICE 1,969,348

RELEASE VALVE FOR AIR BRAKES

Albert E. Baum, Waterloo, Iowa

Application January 19, 1933, Serial No. 652,437

4 Claims. (Cl. 303—80)

My invention pertains to improvements in release valves for air brakes, and an object of my improvements is to supply such a valve with means for permitting the retention of a desired maximum pressure of residual air in the apparatus upon discharge of compressed air in releasing brakes, to thus facilitate the refilling of the apparatus in recharging, saving time and air wastage thereby.

Another object of my improvements is to provide an auxiliary air controlling chamber in the release valve assembly, including a device for the automatic closing of the valve after an action by hand in the opening thereof and whereby the valve may be thus held open automatically during the desired time.

These objects I have successfully accomplished in actual reduction to practice in this art by the means which are hereinafter described and claimed, and which are illustrated in the accompanying drawing, wherein Fig. 1 is a view, partly in elevation, and partly in vertical longitudinal central section through the said auxiliary chamber, with parts broken away, and Fig. 2 is a vertical transverse medial section taken through both chambers of the device, with parts removed. Fig. 3 is an under plan view of the invention as separated from the air brake cylinder. Fig. 4 is a fragmentary view of the device, with parts broken away or in section, showing the piston pushed to one side to uncover the air passage into the cylinder.

The numeral 1 denotes a portion of the top part of an air brake cylinder, and the numeral 3 denotes the main cylinder or chamber of the release valve. The cylinder 3 has a basal threaded connection at 5 with an exteriorly threaded boss on the depending stud 2, and the latter has a conically diminished threaded stem seated in an interiorly threaded port in said brake cylinder. Both the cylinder 3 and the stud 2 have the vertically alined central bearing passages or apertures 9 and 6 respectively therethrough separated by an enlarged inner chamber or cavity 4 whose lower part is diminished to provide a seating socket 7 to receive a coiled compression spring 8 of a desired strength or power, and around the valve-stem 12 of a valve-head 13 seated and tensionally supported on the spring 8 and which fits a coned valve-seat at the top of the chamber 4, the valve also having an upwardly projecting stem seated slidably in the upper bore or passage 9. This passage 9 adjacent the valve-head 13 is widened in diameter to provide a passage around the upper stem from the valve-seat to a lateral port or passage 14.

The numeral 25 denotes an auxiliary cylinder or chamber in communication with the medial port or passage 14. This chamber is horizontal and has end heads supplied with central bearing apertures to loosely seat the end parts of a traversing piston-rod or stem 15, the end parts thus projecting therefrom. A medial imperforate piston 16 is fixed on said stem 15 having at opposite sides sealing disks 17, preferably of leather, which are clamped by split spring rings 18, and when in its medial position shown in Fig. 1, the piston 16 closes the passage 14.

The cylinder 3 has at the top spaced longitudinal lugs 10 having near opposite ends holes to seat the pintle-screws 11 across the interspace of the lugs.

The numeral 19 denotes a flattened body or plate which, as shown in Fig. 1 is seated partially in the interspace of the lugs 10 to project endwise therefrom, and having downwardly and outwardly inclined arms 20 terminating in furcations 20' which are apertured to receive ends of the oppositely extending hand-operated transverse rods 24 fixed therein, whereby a brakeman may use either arm 20 and its rod 24 in opening and otherwise actuating the release valve from either side of a train. The arms 20 have on one face like projections or contact lugs 22 which extend laterally and whose inner walls are for sliding contact at times with the abutting rounded terminations of the piston-rod or stem 15. Each of the lugs is reversed relative to the other, and both have the like cam surfaces 23 which are contacted at times by one or the other end of the stem 15 to hold the stem in position until released by the operator.

As shown by the dotted lines in said Fig. 1 the medial part of the lower edge of the body, or rock-body, 19 is hollowed out at 26 and the upper part of the upper stem of the valve 13 is received contactingly into said cavity against its edge. The side parts of the rock-body 19 have the short vertical slots 21 through which the stems of the screws 11 are passed, whereby when either arm 20 is swung inwardly manually, the body 19 is rocked upon the top of the upper stem 12' of the valve 13, and the slots 21 permit such a rocking of the body 19 as to press downwardly the stem part 12' to open the valve 13 to pass air from the brake cylinder through the passage 14 when opened partially or completely into auxiliary chamber 25.

The release valve well-known in railway use for air brake cylinders is used in this invention so far as the cylinder 3 with its plug 2 in communication with the air brake cylinder 1 is concerned, and including the valve 13 with its oppositely projecting stems 12 and 12', the spring 8 and the rock-body 19 for actuating the said valve, but the said device has no lugs 22, nor my novel and added features of the auxiliary chamber 25 with its valve-head or piston 16 and stem 15 whose ends at times engage the said lugs 22 on the arms 20 for the added coactions which together with the passage 14 between the valve-seat of the valve 13 and the chamber 25 permit the novel functions appertaining to this invention.

It will be therefore understood that in the usual practice of the former apparatus, a brakeman or other may release air from the brake cylinder 1 by pushing manually on either arm 20, whereby the medial edge of the body 19 will push down the stem 12' and open the valve 13 to thus entirely exhaust the compressed air from the brake cylinder. In my invention the valve simultaneously compresses the spring 8, the latter reacting to close the valve when the respective arm 20 is released by the operator. However, it is desirable to leave in the brake cylinder some air under a maximum reduced pressure, instead of discharging air until any air in the brake cylinder is at atmospheric pressure. This is because the engineer finds it advisable to thus retain some residual air under a maximum predetermined pressure in the brake cylinders and entrained connections when the brakes are actually released. Also, when such residual air under reduced pressure or any working pressure is left in the brake cylinder, although the brakes are released by discharge of the major part of the compressed air therefrom, the engineer afterwards has the brake cylinders of a train partially filled with compressed air and may add thereto more air under pressure to bring the total content and pressure up to the working condition of the brake cylinders to set the brakes.

It will therefore be seen, that my improvements permit this retention of such residual air at a determined maximum pressure in the cylinder 1. The operator may, however, hold the arm 20 moved over until the air is completely discharged from the brake cylinder, if found desirable.

When an arm 20 is pushed in, and then released, the lug 22 thereon pushes in the stem 15 to shift the piston 16 completely or even partially to one side, partially or completely opening the communication passage 14 to let compressed air from the brake cylinder pass the lowered valve 13 into the remote end of the auxiliary cylinder 25, whereby the compressed air in the near part of the cylinder 25 then automatically holds the piston 16 completely or partially clear of the passage 14 until the air is exhausted from the brake cylinder to a desired predetermined maximum residual limit of pressure. It will be understood that the operator in moving the arm 20, causes its middle rocking part at 26 to press down the stem 12' to initially open the valve 13, so that the compressed air then fills the near end of the chamber 25 immediately after the stem 12' is lowered and the piston driven into the remote end part of said cylinder 25 to open the passage 14. When the arm is released by the operator, the air having been exhausted to the desired maximum residual pressure in the brake cylinder as determined by the predetermined power of the compressed spring 8, the latter reacts to close the valve 13 automatically. Thus the device becomes automatically closing, although it may be manually opened and manually held open by the operator as long as desired or necessary. The brake cylinder is therefore not emptied of compressed air completely, a desired maximum residual amount at a desired pressure remaining in the brake cylinder after the brake is released, to which may be added other air caused to be injected by the engineer, for quick starting and saving some additional pumping.

As the new combination is easily operated by a brakeman, there is no need for holding it open until all the air is released as air under pressure is discharged from the passage 14 to hold the piston 16 in opened position until such air is reduced in pressure enough to allow the spring 8 to react and close the valve 13, and thus the brakeman is not placed in a position of jeopardy, as often is experienced in such cases as stoppages en route, or in windy places, cold and with icy or frosty earth surfaces, apt to cause accidents and consequent damage suits for a railway company. The applicant's device permits quick and instant automatic operation of the release valve without extra hazard which occurs often in the operation of the old type of release valve above described.

The stem 15 works loosely in the bearing apertures in the end heads of the cylinder 25, and air in the near end thereof thus readily exhausted from the cylinder through such an aperture, the air in the remote end part of the cylinder 25 being then under atmospheric pressure.

It should further be noted, that said Fig. 4 discloses the device as being manually operable, because when the device has been moved to the position shown in said figure, air will be supplied to the cylinder on the right of the piston 16 and thereby quickly move the piston to the left until the part 15 engages the cam member 23.

Having described my invention, what I claim as new, and desire to secure by Letters Patent, is:

1. In a device of the character described having a valve chamber containing a valve seat in communication with a reservoir of a fluid under pressure, a valve in said chamber for closing said seat, resilient means of predetermined power for opening said valve, and operating means for opening said valve while tensioning said resilient means, the combination therewith of a cylinder with apertured heads and having a communication with said valve chamber by way of said valve seat, a reciprocatory piston in said cylinder normally positioned over said communication and having oppositely projecting rods extending loosely through the cylinder-head apertures, and said operating means having like opposite arms with which either of the terminations of said piston-rods may be at times in driven sliding contact, whereby when said means are moved in either of two directions said piston is moved to open said communication to exhaust fluid under pressure in the reservoir as said valve is simultaneously moved to open position and the piston is held in open position by the fluid in the cylinder until its pressure is reduced sufficiently to permit the resilient means to react and close the valve.

2. In a device of the character described having a valve chamber containing a valve seat in communication with a reservoir of a fluid under pressure, a valve in said chamber for closing said seat, resilient means of predetermined power for closing said valve, and operating means for opening said valve while compressing said resilient means to its predetermined limit of tension, the combination therewith of a cylinder with apertured heads and having a communication from the mid-point of said cylinder with said valve chamber by way of said valve seat, a reciprocatory piston in said cylinder normally positioned over said communication and having oppositely projecting rods extending loosely through the cylinder-head apertures, said operating means including like arms having thereon like contacts at times in engagement with the terminations of said rods, whereby when said means are moved in either of opposite directions said piston is moved from over said communication and the piston is releasably held in this position by the pressure of fluid entering the cylinder until the fluid is exhausted to a predetermined pressure.

3. In a device of the character described having a valve chamber containing a valve seat in communication with a reservoir of a fluid under pressure, a valve in said chamber for closing said seat, resilient means of predetermined power for closing said valve, and operating means for opening said valve while tensioning said resilient means to a predetermined extent, the combination therewith of a cylinder with an apertured head and having a communication with said valve chamber by way of said valve seat, a reciprocatory piston in said cylinder normally positioned over said communication and having a rod extending loosely through said head aperture, and said operating means having an arm provided with a part thereon shaped for occasional pressing and sliding contact with the outer termination of said piston rod, whereby when said piston moves to open said communication with the valve chamber while the valve therein is open the piston is held open until the fluid is exhausted to a degree to allow the resilient means to react to close said valve and permitting the resilient means to thus cause the return of the piston over said communication.

4. In a device of the character described having a valve chamber containing a valve seat in communication with a reservoir of fluid under pressure, a valve in said chamber for closing said seat, resilient means of a predetermined power for closing said valve, the combination therewith of a cylinder with an apertured head and having a communication with said valve chamber by way of said valve seat, a piston in said cylinder normally positioned over said communication and having a rod extending through the aperture in said head loosely, and an operating member mounted movably upon said valve chamber having one part movably engaged at times with the outer end of said piston-rod and having another part engaged movably with a part of said valve, whereby both the valve and the piston may be simultaneously shifted to open communication between the reservoir and the atmosphere by way of the aperture in the cylinder-head and held open by the pressure of the escaping fluid from the reservoir in said cylinder until the fluid pressure in the cylinder becomes reduced to a predetermined limit to permit said valve to react to retain the fluid in said device residually at that pressure.

ALBERT E. BAUM.